(12) United States Patent
Lafont (10) Patent No.: US 12,429,014 B2
(45) Date of Patent: Sep. 30, 2025

(54) PROPULSION ASSEMBLY COMPRISING A FUEL CONDITIONING SYSTEM POSITIONED BEHIND A DEBRIS EJECTION ZONE, AIRCRAFT COMPRISING AT LEAST ONE SUCH PROPULSION ASSEMBLY

(71) Applicant: Airbus Operations SAS, Toulouse (FR)

(72) Inventor: Laurent Lafont, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/608,132

(22) Filed: Mar. 18, 2024

(65) Prior Publication Data
US 2024/0317418 A1  Sep. 26, 2024

(30) Foreign Application Priority Data

Mar. 20, 2023 (FR) .................................... 2302570

(51) Int. Cl.
| | |
|---|---|
| *F02K 1/82* | (2006.01) |
| *B64D 37/34* | (2006.01) |
| *F02C 3/22* | (2006.01) |
| *F02C 7/224* | (2006.01) |

(52) U.S. Cl.
CPC ............. *F02K 1/822* (2013.01); *F02C 3/22* (2013.01); *F02C 7/224* (2013.01); *B64D 37/34* (2013.01); *F05D 2260/213* (2013.01)

(58) Field of Classification Search
CPC ... F02C 7/22; F02C 7/224; F02C 7/05; B64D 37/30; B64D 37/32; B64D 37/34; B64D 29/00; B64D 33/04; F02K 1/82; F02K 1/822; F01D 25/30
See application file for complete search history.

(56) References Cited

U.S. PATENT DOCUMENTS

| | | | | |
|---|---|---|---|---|
| 3,237,400 | A | 3/1966 | Kuhrt | |
| 3,352,105 | A * | 11/1967 | Cox | B64D 45/00 |
| | | | | 285/415 |
| 5,052,176 | A * | 10/1991 | Labatut | F23R 3/20 |
| | | | | 60/761 |
| 6,397,581 | B1 * | 6/2002 | Vidal | F23R 3/007 |
| | | | | 428/116 |
| 10,989,117 | B2 * | 4/2021 | Roberge | F02C 3/22 |
| 11,867,122 | B2 * | 1/2024 | Carretero Benignos | |
| | | | | F02C 7/224 |
| 11,873,768 | B1 * | 1/2024 | Dindar | F02C 9/40 |
| 11,898,495 | B1 * | 2/2024 | Dindar | F02C 3/22 |
| 11,952,946 | B2 * | 4/2024 | Muldoon | F28D 7/106 |

(Continued)

OTHER PUBLICATIONS

French Search Report for corresponding French Patent Application No. 2302570 dated Oct. 11, 2023.

*Primary Examiner* — Alain Chau
(74) *Attorney, Agent, or Firm* — Greer, Burns & Crain, Ltd.

(57) ABSTRACT

A propulsion assembly comprising a propulsion system including at least one exhaust duct, from which an exhaust gas stream is discharged, and also a debris ejection zone, a supply device, configured to supply the propulsion system with gaseous fuel, including at least one conditioning system for the gaseous fuel, at least one enclosure in which the conditioning system is positioned, the enclosure being located in the propulsion assembly behind the debris ejection zone. Also an aircraft including at least one such propulsion assembly.

11 Claims, 4 Drawing Sheets

(56) References Cited

U.S. PATENT DOCUMENTS

| | | | | |
|---|---|---|---|---|
| 12,000,294 B2* | 6/2024 | De Blois | ............... | F02C 7/32 |
| 12,031,502 B2* | 7/2024 | Bond | ............... | B64D 33/08 |
| 12,085,280 B2* | 9/2024 | Clark | ............... | F23R 3/005 |
| 12,188,415 B2* | 1/2025 | Owoeye | ............... | F02C 7/14 |
| 2004/0237948 A1* | 12/2004 | Magyari | ............... | F02C 7/224 |
| | | | | 123/557 |
| 2012/0168121 A1* | 7/2012 | Jarmon | ............... | B64D 37/34 |
| | | | | 165/80.1 |
| 2016/0131039 A1* | 5/2016 | Meyst | ............... | F28F 9/02 |
| | | | | 415/177 |
| 2019/0113233 A1* | 4/2019 | Snyder | ............... | F23R 3/283 |
| 2020/0088099 A1* | 3/2020 | Roberge | ............... | F02C 7/224 |
| 2020/0088102 A1* | 3/2020 | Roberge | ............... | F02C 7/224 |
| 2020/0386162 A1* | 12/2020 | Stillman | ............... | F02C 7/185 |
| 2022/0099020 A1* | 3/2022 | Palmer | ............... | F02C 9/26 |
| 2022/0154596 A1* | 5/2022 | De Blois | ............... | F01D 25/002 |
| 2022/0220924 A1 | 7/2022 | Bond et al. | | |
| 2022/0403780 A1* | 12/2022 | Price | ............... | F02C 7/14 |
| 2023/0258131 A1* | 8/2023 | Muldoon | ............... | F28D 7/106 |
| | | | | 60/772 |
| 2023/0280032 A1* | 9/2023 | Clark | ............... | F02C 7/224 |
| | | | | 60/730 |
| 2024/0133343 A1* | 4/2024 | Palmer | ............... | F02C 3/22 |

* cited by examiner

PROPULSION ASSEMBLY COMPRISING A FUEL CONDITIONING SYSTEM POSITIONED BEHIND A DEBRIS EJECTION ZONE, AIRCRAFT COMPRISING AT LEAST ONE SUCH PROPULSION ASSEMBLY

CROSS-REFERENCES TO RELATED APPLICATIONS

This application claims the benefit of French Patent Application Number 2302570 filed on Mar. 20, 2023, the entire disclosure of which is incorporated herein by way of reference.

FIELD OF THE INVENTION

The present application relates to a propulsion assembly comprising a fuel conditioning system, and also to an aircraft comprising at least one such propulsion assembly.

BACKGROUND OF THE INVENTION

Figure 1:
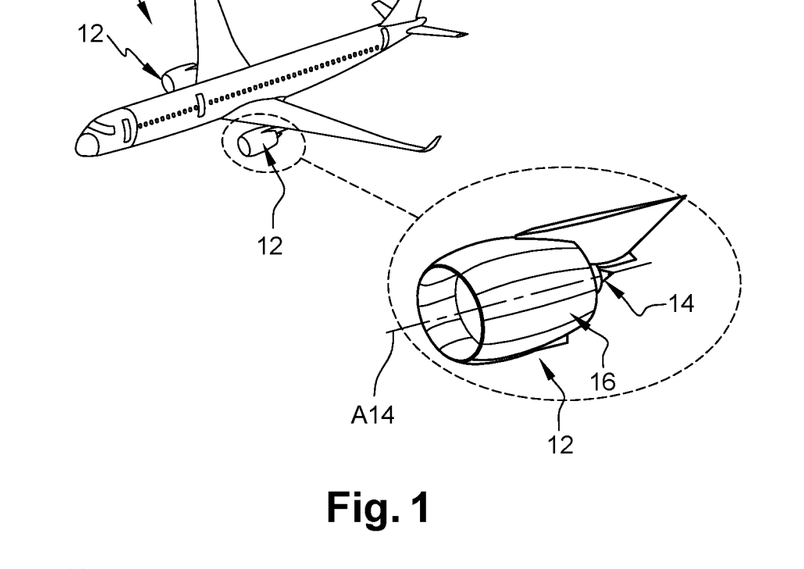
FIG. 1 is a perspective view of an aircraft and, extracted from this view, a magnified view of a propulsion assembly showing one embodiment.

According to one embodiment shown in FIG. 1, an aircraft 10 comprises several propulsion assemblies 12 each comprising a propulsion system 14 and also a nacelle 16 surrounding the propulsion system 14 and notably enabling an air flow to be channeled towards the propulsion system 14.

The propulsion system 14 has an axis of rotation A14. In the remainder of the description, a longitudinal direction is a direction parallel to the axis of rotation A14. A longitudinal plane is a plane that contains the axis of rotation A14. A transverse plane is a plane perpendicular to the axis of rotation A14. Finally, the concepts "front" and "rear" refer to the direction of the air flow in the propulsion system when in operation, which flows from the front to the rear.

Figure 2:
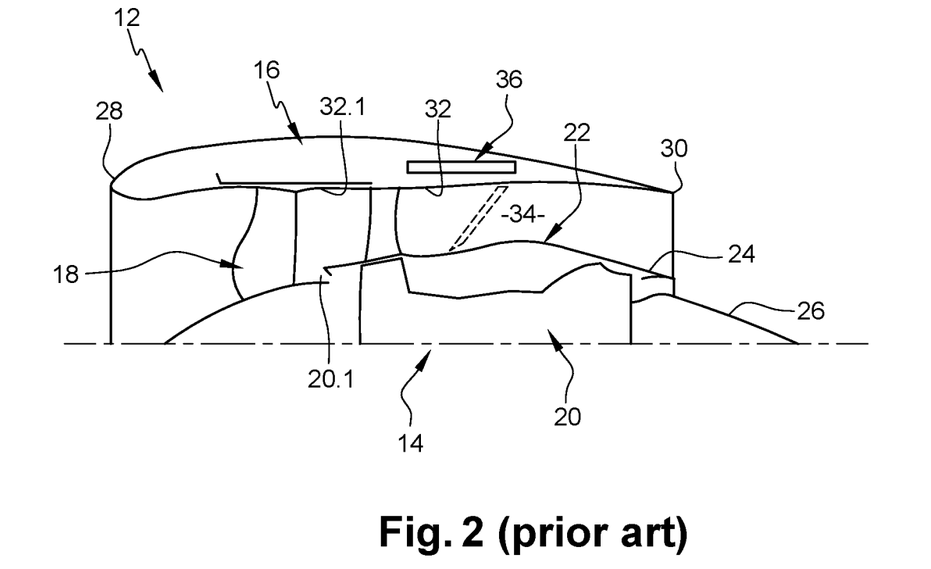
FIG. 2 is a schematic longitudinal half section of an aircraft propulsion assembly showing one embodiment of the prior art.

According to one embodiment shown in FIG. 2, the propulsion system 14 comprises a fan 18 and an engine 20 positioned behind the fan. The engine 20 includes an engine casing 22 spaced apart from the nacelle 16 and, from the front to the rear, at least one engine air intake 20.1 configured to capture a primary air flow, at least one compression system, at least one combustion chamber, at least one turbine system, and also an engine nozzle 24 configured to eject an exhaust air stream. According to one embodiment, the engine 20 comprises a cone 26 positioned concentrically in the engine nozzle 24.

The nacelle 16 comprises, at the front, an air intake 28 configured to channel the air towards the fan 18 of the propulsion system 14, an air outlet 30 located about the engine nozzle 24, and also an inner wall 32, spaced apart from the engine casing 22 of the propulsion system 14, which delimits with the latter an annular duct 34 channeling a secondary air flow. The inner wall 32 comprises reinforced zones 32.1 configured to retain debris ejected by the engine 20, notably in the event of blade breakage.

According to one configuration, the rear end of the air outlet 30 of the nacelle 16 is positioned approximately in the same transverse plane as the rear end of the engine nozzle 24, the rear point of the cone 26 being offset backwards in relation to the transverse plane of the rear end of the engine nozzle 24.

According to one embodiment, the propulsion assembly 12 comprises forks connecting the engine 20 and the nacelle 16, positioned at 12 o'clock and 6 o'clock for example, and also a thrust reversal system 36 built into the nacelle 16.

In the case of a hydrogen-powered propulsion system 14, the aircraft comprises a hydrogen supply device including at least one tank configured to store the hydrogen at a cryogenic temperature, and also a conditioning system configured to compress the hydrogen to a very high pressure, to vaporize then heat the hydrogen, before sending the hydrogen to the combustion chamber of the engine 20.

On account of the complexity thereof and the risk of damage in the event of blade breakage, the hydrogen conditioning system is difficult to build into the nacelle 16. Consequently, the intention is to install said system in the fuselage of the aircraft. This solution is not entirely satisfactory, since it complicates the circuit conveying hot air drawn from the engine 20 to the hydrogen conditioning system to heat the hydrogen.

The present invention is intended to overcome some or all of the aforementioned drawbacks.

SUMMARY OF THE INVENTION

For this purpose, the invention relates to a propulsion assembly, comprising:
- a propulsion system including at least one exhaust duct, from which an exhaust gas stream is discharged, and also a debris ejection zone,
- a supply device, configured to supply the propulsion system with gaseous fuel, including at least one conditioning system for the gaseous fuel and also at least one downstream duct connecting the conditioning system and the propulsion system.

According to the invention, the supply device comprises at least one enclosure in which the conditioning system is positioned, said enclosure being located in the propulsion assembly behind the debris ejection zone.

This positioning protects the conditioning system in the event of ejection of debris from the propulsion system and limits the risks related to the presence of hydrogen in the vicinity of the engine, while exploiting the advantages obtained by positioning the conditioning system inside the propulsion assembly.

According to another feature, the enclosure is ring-shaped and is positioned about the exhaust duct of the propulsion system and/or the exhaust gas stream coming out of the exhaust duct.

According to another feature, the propulsion assembly comprises a nacelle, surrounding the propulsion system, which has an inner wall spaced apart from the propulsion system, an aerodynamic outer wall, and also a rear transverse face connecting the inner wall and the aerodynamic outer wall. Additionally, the enclosure comprises a front transverse wall pressed against the rear transverse face of the nacelle, and also substantially concentric inner and outer walls respectively extending the inner wall and the aerodynamic outer wall of the nacelle.

According to another feature, the conditioning system comprises at least one heat exchanger close to or in contact with the hot exhaust gas stream coming out of the propulsion system.

According to another feature, the conditioning system comprises at least a first heat exchanger close to or in contact with the exhaust gas stream coming out of the exhaust duct, in which a heat-transfer fluid other than the gaseous fuel circulates, at least a first circuit channeling the heat-transfer fluid, at least a second circuit channeling the gaseous fuel, and also at least a second heat exchanger that is remote from the exhaust gas stream, traversed by the first and second circuits and configured to exchange heat between the heat-transfer fluid and the gaseous fuel.

According to another feature, the supply device comprises a jet nozzle configured to extend the exhaust duct and to accommodate or bear at least one heat exchanger, said jet nozzle being spaced apart from the enclosure and connected to the latter by at least one aerodynamic fork and configured to accommodate a circuit portion channeling a fluid traversing the heat exchanger.

According to another feature, the propulsion assembly comprises a connection system connecting the exhaust duct and the jet nozzle.

According to another feature, the jet nozzle comprises a front end oriented towards the exhaust duct and positioned about the exhaust duct, the propulsion assembly comprising at least one ring gasket interposed between the front end of the jet nozzle and the exhaust duct.

According to another feature, the enclosure is fluid-tight and contains a protective atmosphere.

According to another feature, the supply device comprises a vacuum system that is configured to extract a gas from the enclosure, that is static in relation to the propulsion assembly, and that is configured to maintain a very low pressure in the enclosure.

According to another feature, the supply device comprises at least one shield configured to protect the downstream duct and to withstand any debris projected by the propulsion system.

The invention also relates to an aircraft comprising at least one propulsion assembly according to one of the above features.

According to another feature, the aircraft comprises, for each propulsion assembly, a pylon connecting said assembly to a part of the aircraft and also a connection system connecting the enclosure and the pylon.

BRIEF DESCRIPTION OF THE DRAWINGS

Other features and advantages are set out in the description of the invention below, given purely by way of example and with reference to the attached drawings, in which.

DETAILED DESCRIPTION OF THE PREFERRED EMBODIMENTS

Figure 3:
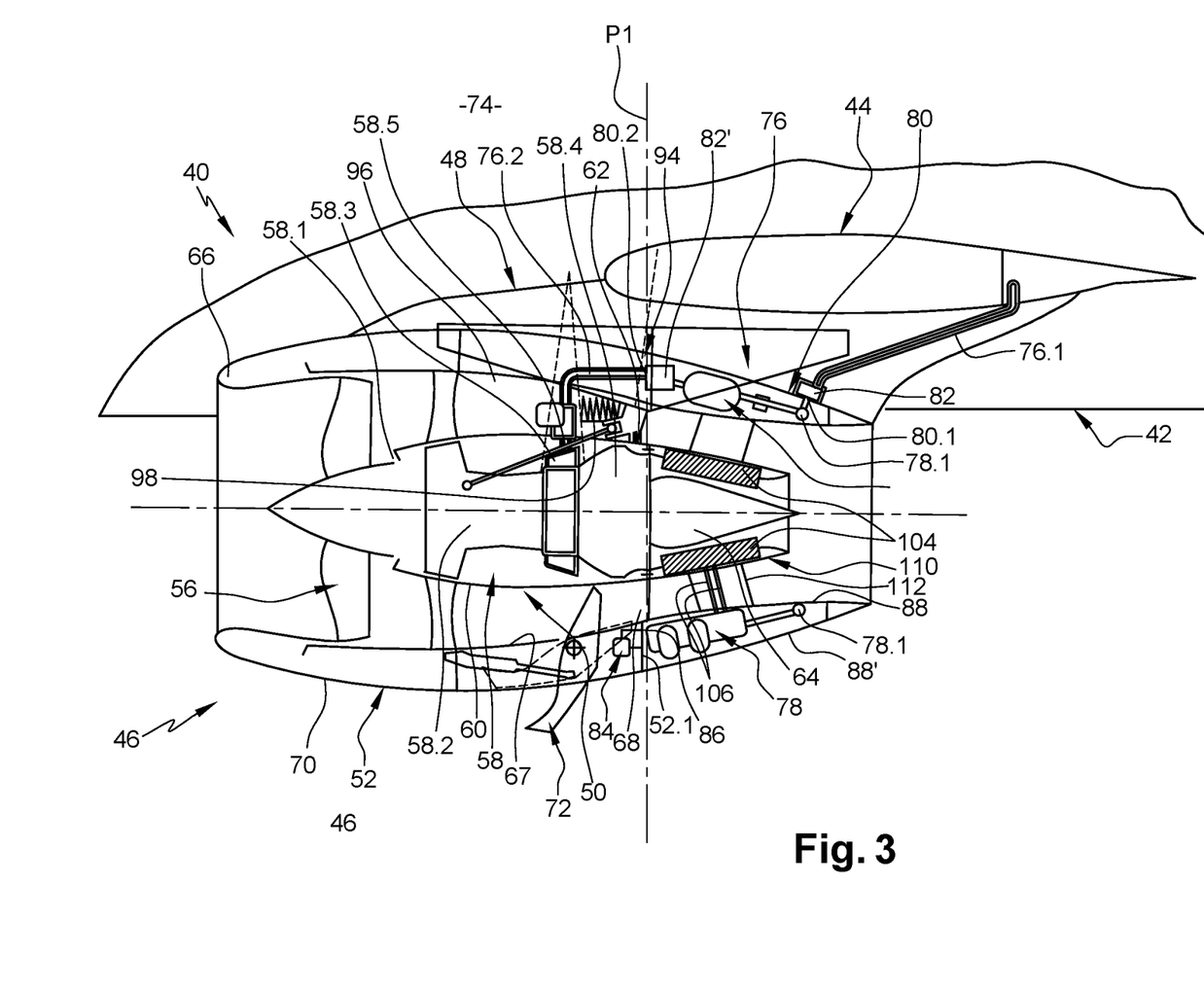
FIG. 3 is a schematic longitudinal cross section of an aircraft propulsion assembly showing one embodiment of the invention.

According to one embodiment shown in FIG. 3, an aircraft 40 comprises a fuselage 42, wings 44 positioned on either side of the fuselage 42, and also at least one propulsion assembly 46. According to one configuration, the aircraft 40 comprises several propulsion assemblies 46 positioned beneath the wings 44, each of which is connected to a wing by a pylon 48. Naturally, the invention is not limited to this embodiment. The propulsion assembly 46 may be connected by the pylon 48 to another part of the aircraft and positioned otherwise.

Each propulsion assembly 46 comprises a propulsion system 50 and also a nacelle 52 surrounding the propulsion system 50.

Figure 8:
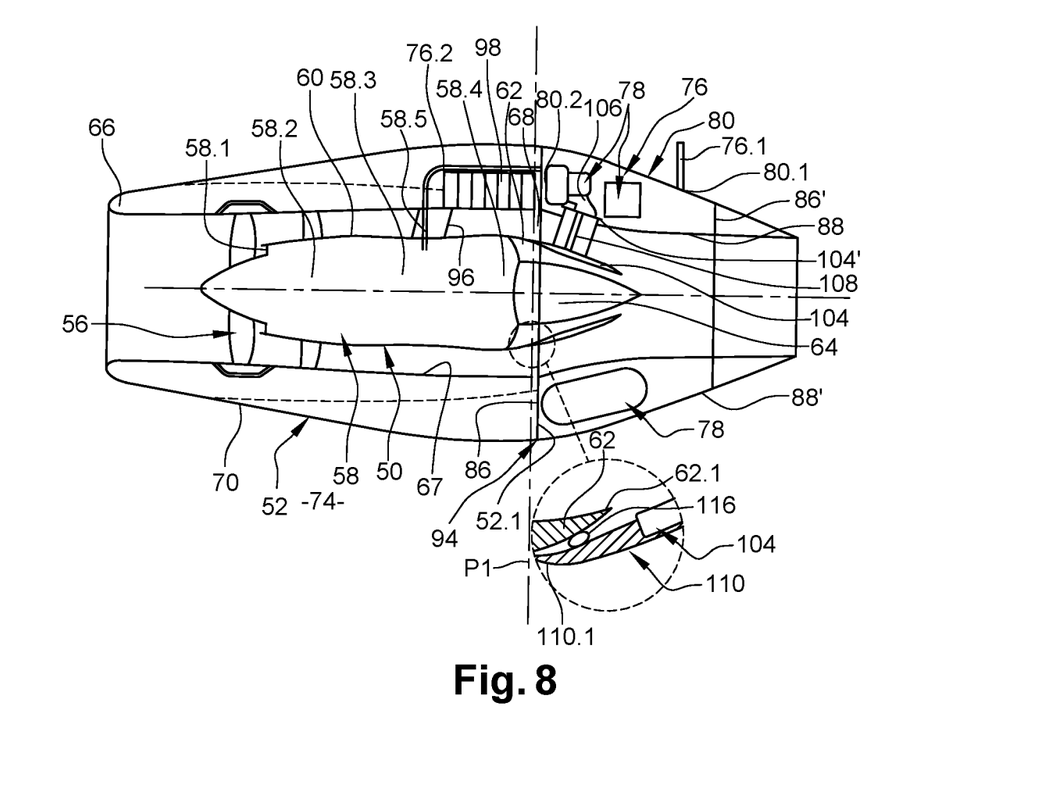

According to one embodiment shown in FIGS. 3 and 8, the propulsion system 50 is a dual-flow propulsion system. This propulsion system comprises a fan 56 and an engine 58 positioned behind the fan 56. This engine 58 includes an engine casing 60 spaced apart from the nacelle 52 and, from the front to the rear, at least one engine air intake 58.1 configured to capture a primary air flow, at least one compression system 58.2, at least one combustion chamber 58.3, at least one turbine system 58.4, and also an engine nozzle 62 configured to eject a hot exhaust gas stream. According to one embodiment, the engine 58 comprises a cone 64 positioned concentrically in the engine nozzle 62.

The nacelle 52 comprises an air intake 66 located at the front and configured to channel an air flow towards the propulsion system 50, an air outlet 68 located about the engine nozzle 62, an inner wall 67 connecting the air intake 66 and air outlet 68 and spaced apart from the propulsion system 50, more specifically from the engine casing 60 thereof, delimiting with the latter an annular duct channeling a secondary air flow, and also an aerodynamic outer wall 70 connecting the air intake 66 and air outlet 68.

According to one configuration, the propulsion assembly 46 comprises a thrust reversal system 72 aligned with the engine 58. According to one embodiment, the thrust reversal system 72 comprises pivoting gates to keep the part of the nacelle 52 located between the thrust reversal system 72 and the air outlet 68 static.

As shown in FIGS. 3 and 8, the propulsion system 50 and the nacelle 52 may have an annular duct of variable length.

Figure 7:
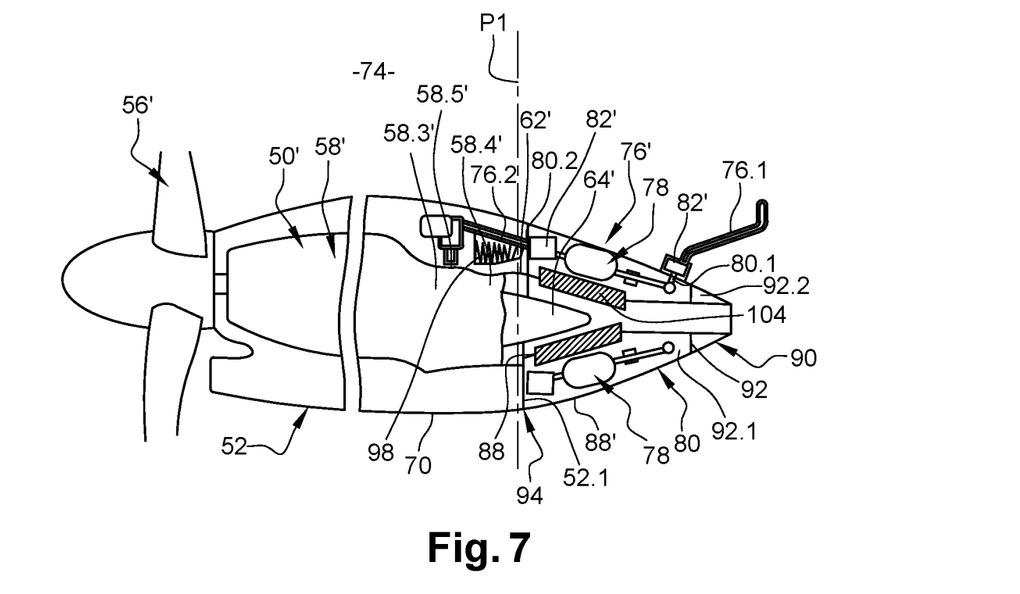
FIG. 7 is a schematic longitudinal cross section of an aircraft propulsion assembly showing another embodiment of the invention, and, FIG. 8 is a schematic longitudinal cross section of an aircraft propulsion assembly showing another embodiment of the invention.

According to another embodiment shown in FIG. 7, the propulsion system 50' is a turboprop engine that includes a propeller 56' and an engine 58' positioned behind the propeller 56'. This engine 58' comprises, from the front to the rear, at least one engine air intake configured to capture a primary air flow, at least one compression system, at least one combustion chamber 58.3', at least one turbine system 58.4', and also an engine nozzle 62' configured to eject a hot exhaust gas stream. According to one embodiment, the engine 58 comprises a cone 64' positioned concentrically in the engine nozzle 62'.

Naturally, the invention is not limited to these embodiments for the propulsion system 50, 50'. Regardless of the embodiment, the propulsion assembly 46 comprises a propulsion system 50, 50' including at least one exhaust duct for an exhaust gas stream (such as the engine nozzle 62, 62') that has a rear end 62.1 and also a debris ejection zone 74 located in front of a transverse plane P1 passing through the rear end 62.1 of the exhaust duct 62, 62'. The propulsion system 50, 50' is powered by a gaseous fuel, such as hydrogen for example.

The engine 58, 58' comprises at least one fuel intake 58.5 to supply the combustion chamber(s) 58.3, 58.3'. Additionally, the aircraft 40 comprises a supply device 76 configured to supply the propulsion system 50, 50' with gaseous fuel by conveying said fuel from at least one fuel tank to at least one fuel intake 58.5, 58.5'. According to one application, each fuel tank is configured to store hydrogen at a cryogenic temperature. The fuel tank(s) may be positioned in the wings 44 and/or in the fuselage 42.

The supply device 76 comprises at least one conditioning system 78 for the gaseous fuel, at least one upstream duct 76.1 connecting the fuel tank and the conditioning system 78, and also at least one downstream duct 76.2 connecting the conditioning system 78 and the propulsion system 50, 50', more specifically the fuel intake 58.5, 58.5' thereof. The concepts "upstream" and "downstream" refer to the direction of flow of the gaseous fuel, which flows from upstream to downstream between the fuel tank and the propulsion system 50, 50'.

Where the gaseous fuel is hydrogen, the conditioning system 78 comprises at least one of the following items of equipment: a high-pressure pump for the fuel, a vaporization system for the fuel, a heat exchanger to heat the fuel, at least one valve, at least one flow rate sensor, at least one buffer tank and at least one duct. Naturally, the invention is not limited to this list for the equipment of the conditioning system 78. The conditioning system 78 usually comprises several items of equipment connected in series and/or in parallel by ducts. Regardless of the embodiment, the conditioning system 78 comprises at least one item of equipment for modifying and/or determining at least one feature of the gaseous fuel (state, pressure, temperature, flow rate, etc.), channeling and/or storing the gaseous fuel.

According to one feature, the supply device 76 comprises at least one enclosure 80, in which the conditioning system 78 is positioned, located in the propulsion assembly 46 behind the plane P1 and the debris ejection zone 74, outside this zone 74. This positioning limits the risk of damage to the conditioning system 78 caused by debris from the engine 58, 58' in the event of an accident. Furthermore, this limits the risk of damage to the propulsion system 50, 50' in the event of malfunction of the conditioning system 78.

The enclosure 80 comprises at least one inlet 80.1 traversed by the upstream duct 76.1 and also at least one outlet 80.2 traversed by the downstream duct 76.2, the upstream and downstream ducts 76.1, 76.2 being sealingly connected to the enclosure 80.

According to one embodiment, the supply device 76 comprises at least one shut-off valve 82 configured to interrupt circulation of the gaseous fuel. According to one configuration, the supply device 76 comprises a first shut-off valve 82 positioned at the inlet 80.1 of the enclosure 80 and also a second stop valve 82' positioned at the outlet 80.2 of the enclosure 80.

The enclosure 80 is fluid-tight and contains a protective atmosphere.

According to one configuration, the protective atmosphere is at very low pressure, i.e., a near-zero pressure and/or comprises an inerting gas. The vacuum inside the enclosure 80 also helps to provide thermal insulation.

According to one embodiment, the supply device 76 comprises a vacuum system 84 in communication with the inside of the enclosure 80 and configured to extract the gas from the enclosure 80. According to one configuration, the vacuum system 84 is static in relation to the propulsion assembly 46 and configured to maintain a very low, near-zero pressure in the enclosure 80. By way of example, the vacuum system 84 is connected to the enclosure 80 and positioned outside the enclosure 80.

According to another feature, the enclosure 80 is ring-shaped and is positioned about the exhaust duct 62, 62' of the propulsion system 50, 50' and/or the exhaust gas stream coming out of the exhaust duct 62, 62'. According to one configuration, the enclosure 80 is substantially (i.e., +/−10%) axisymmetrical. The annular and preferably axisymmetrical shape endows the enclosure 80 with greater pressure resistance.

Figure 5:
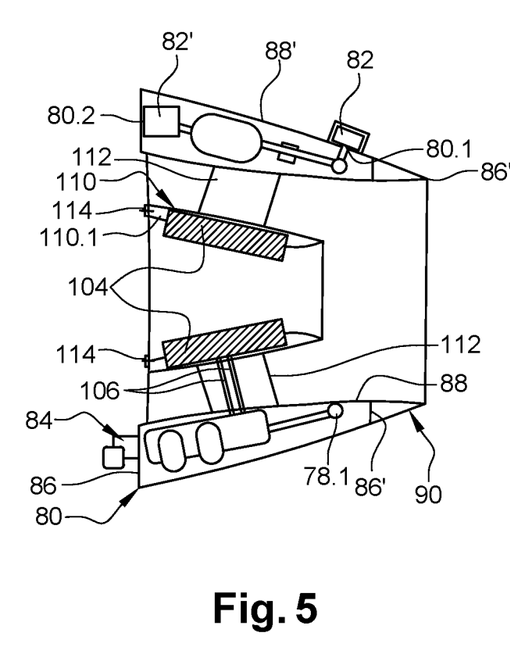
FIG. 5 is a longitudinal cross section of the enclosure shown in FIG. 4, in which a fuel conditioning system is positioned, showing one embodiment of the invention.

According to this solution, the enclosure 80 has a large volume enabling the equipment of the conditioning system 78 to be distributed over the entire circumference of the enclosure 80. By way of example, the conditioning system 78 comprises an annular duct 78.1 that extends over the entire circumference of the enclosure 80 and supplies several items of equipment distributed about the circumference of the enclosure 80.

Figure 4:
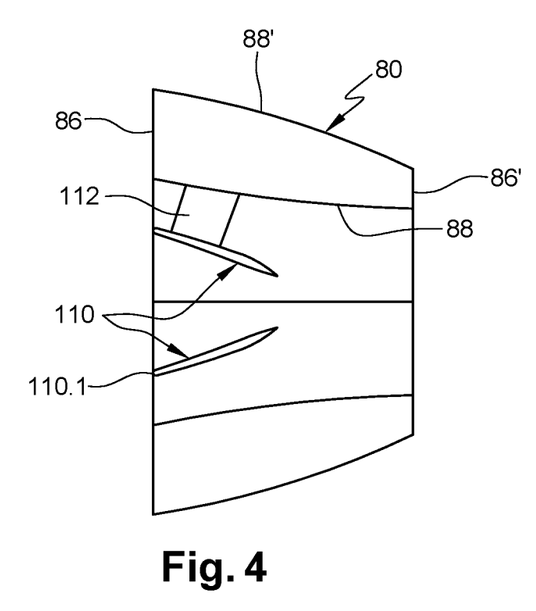
FIG. 4 is a longitudinal cross section of an enclosure positioned behind the propulsion assembly shown in FIG. 3, without the fuel conditioning system, showing one embodiment of the invention.

According to one embodiment shown in FIG. 4, the enclosure 80 comprises a front transverse wall 86, a rear transverse wall 86' that is substantially parallel to the front transverse wall 86 and offset backwards in relation to the front transverse wall 86, substantially concentric inner and outer walls 88, 88' connecting the front and rear transverse walls 86, 86', the inner wall 88 being located inside the outer wall 88'. According to this embodiment, the propulsion assembly 46 comprises an extension 90 extending the enclosure 80 as far as a trailing edge 86", the extension 90 being fastened by connecting elements to the enclosure 80.

In a variant, the enclosure 80 comprises a trailing edge 86" instead of the rear transverse wall 86'. According to this variant, the enclosure comprises a transverse partition 92 delimiting a front compartment 92.1, in which the conditioning system 78 is positioned, containing a protective atmosphere, and also a rear compartment 92.2 that extends between the transverse partition 92 and the trailing edge 86". The enclosure 80 may comprise several partitions to partition the enclosure 80.

According to one embodiment, the enclosure 80 is located in the nacelle 52, more specifically in a part of the nacelle 52 located behind the plane P1, outside the debris ejection zone 74. According to this arrangement, the nacelle 52 is extended so that a volume inside the nacelle 52, positioned behind the plane P1 and outside the debris ejection zone 74, is large enough to accommodate the conditioning system 78.

According to another embodiment shown in FIGS. 3 and 8, the enclosure 80 is arranged to extend the nacelle 52, the outer wall 88' of the enclosure 80 extending the aerodynamic outer wall 70 of the nacelle 52, the inner wall 88 of the enclosure 80 extending the inner wall 67 of the nacelle 52.

In this embodiment, the nacelle 52 comprises a rear transverse face 52.1, connecting the inner wall 67 and the aerodynamic outer wall 70, positioned approximately in the same transverse plane as the rear end of the exhaust duct 62, 62' of the propulsion system 50, 50', against which the front transverse wall 86 of the enclosure 80 is pressed.

According to a first configuration, the propulsion assembly 46 comprises a connection system 94 connecting the enclosure 80 and the nacelle 52, such as a plurality of connecting elements (for example bolts) distributed about the circumference of the nacelle 52.

According to another configuration, the aircraft comprises a connection system 94 connecting the enclosure 80 and the pylon 48. This configuration limits the propagation of vibration from the propulsion system 50, 50' towards the enclosure 80.

Naturally, the invention is not limited to these configurations for the connection system 94. Thus, the enclosure 80 may be connected to the fuselage, to a wing, or to a part of the propulsion system 50, 50'.

According to the embodiment shown in FIG. 3, the upstream duct 76.1 passes through the pylon 48 and the downstream duct 76.2 passes through a fork 96 connecting the nacelle 52 and the propulsion system 50. This fork 96 may be dedicated to the downstream duct 76.2 or otherwise.

According to one configuration, if the downstream duct 76.2 passes through the debris ejection zone 74, the supply device 76 comprises at least one shield 98 that is configured to protect the downstream duct 76.2 and to withstand any debris projected by the propulsion system 50, 50', interposed between the downstream duct 76.2 and the propulsion system 50, 50'.

According to one embodiment shown in FIG. 7, the inner wall 88 of the enclosure 80 is arranged to extend the engine nozzle 62'.

Figure 6:
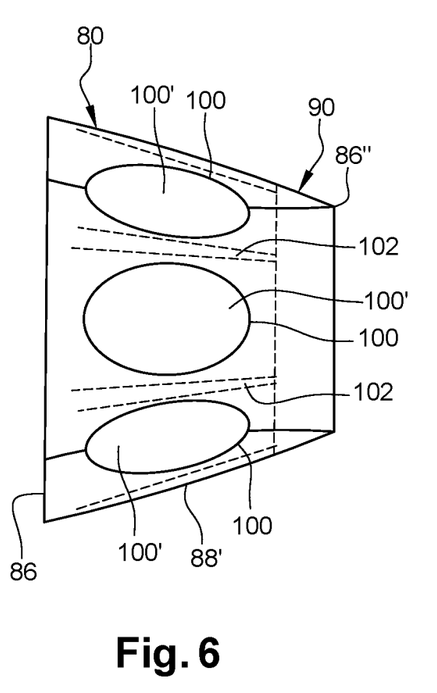
FIG. 6 is a side view of the enclosure shown in FIG. 4.

As shown in FIG. 6, the enclosure 80 comprises at least one opening 100 configured to enable access to the inside of the enclosure 80 and also, for each opening, a hatch 100' configured to sealingly close the opening 100 related thereto. According to one arrangement, the enclosure 80 comprises several openings 100 distributed about the circumference thereof.

According to one configuration shown in FIG. 6, at least one wall of the enclosure 80 comprises at least one thickness reduction 102 to control the effects of a potential explosion.

According to one configuration, the conditioning system 78 comprises at least one heat exchanger 104 close to or in contact with the hot exhaust gas stream coming out of the propulsion system 50, 50' to capture the heat therefrom and to return said heat directly or indirectly to the gaseous fuel.

According to a first variant shown notably in FIGS. 3, 5 and 7, the conditioning system 78 comprises at least one heat exchanger 104 close to or in contact with the exhaust gas stream coming out of the propulsion system 50, 50' in order to capture the heat therefrom and to return said heat directly to the gaseous fuel, and also at least one circuit 106 channeling the gaseous fuel and traversing the heat exchanger 104.

According to a second variant shown in FIG. 8, the conditioning system 78 comprises at least a first heat exchanger 104 close to or in contact with the exhaust gas stream coming out of the propulsion system 50, 50' in order to capture the heat therefrom and to return said heat to a heat-transfer fluid (such as nitrogen for example), other than the gaseous fuel, at least a first circuit 108 channeling the heat-transfer fluid, at least a second circuit 106 channeling the gaseous fuel, and also at least a second heat exchanger 104' that is remote from the exhaust gas stream, traversed by the first and second circuits 108, 106 and configured to exchange heat between the heat-transfer fluid and the gaseous fuel. According to this second variant, the gaseous fuel remains remote from the very hot zones such as the exhaust duct 62, 62' of the propulsion system 50, 50' of an aircraft.

According to one embodiment intended for dual-flow propulsion systems 50, as shown in FIGS. 3 to 5 and 8, the supply device 76 comprises a jet nozzle 110 configured to extend the exhaust duct 62 and to accommodate or bear at least one heat exchanger 104 close to or in contact with the hot exhaust gas stream coming out of the exhaust duct 62 in order to capture the heat therefrom. The jet nozzle 110 is connected to the enclosure 80 by at least one fork 112 configured to accommodate a circuit portion channeling a fluid (the gaseous fuel or the heat-transfer fluid) traversing the heat exchanger 104. The jet nozzle 110 is spaced apart from the enclosure 80 to enable the passage of the secondary air flow. Each fork 112 is aerodynamic to limit the disturbance caused by the secondary air flow.

The fork(s) 112 is (or are) dimensioned to absorb forces between the enclosure 80 and the jet nozzle 110.

The jet nozzle 110 comprises a front end 110.1, oriented towards the exhaust duct 62, that cooperates with the rear end 62.1 of the exhaust duct 62 over the entire circumference of the jet nozzle 110.

According to a configuration shown in FIG. 3, the propulsion assembly 46 comprises a connection system 114 connecting the exhaust duct 62 and the jet nozzle 110, more specifically the rear end 62.1 of the exhaust duct 62 and the front end 110.1 of the jet nozzle 110. According to one embodiment, the connection system comprises several connecting elements (for example bolts) distributed about the circumference of the jet nozzle 110.

According to another configuration shown in FIG. 8, the front end 110.1 of the jet nozzle 110 is positioned about the exhaust duct 62, more specifically the rear end 62.1 thereof. Additionally, the propulsion assembly comprises at least one ring gasket 116 interposed between the front end 110.1 of the jet nozzle 110 and the exhaust duct 62.

Naturally, the invention is not limited to the embodiments described above. Regardless of the embodiment, the conditioning system 78 is positioned in at least one enclosure 80 located outside the debris ejection zone 74. In addition to protecting the conditioning system 78 in the event of ejection of debris from the propulsion system 50, 50', this positioning reduces the risks related to hydrogen being in the vicinity of the engine, thereby protecting the fuselage and the wings.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly, comprising:
 a propulsion system including at least one exhaust duct, from which an exhaust gas stream is discharged, and a debris ejection zone,
 a nacelle surrounding the propulsion system and comprising an inner wall spaced apart from the propulsion system, an aerodynamic outer wall, and a rear transverse face connecting the inner wall and the aerodynamic outer wall, and,
 a supply device configured to supply the propulsion system with gaseous fuel and comprising at least one conditioning system for the gaseous fuel and at least one downstream duct connecting the at least one conditioning system and the propulsion system,
 wherein the supply device further comprises at least one enclosure in which the conditioning system is positioned, the at least one enclosure located in the propulsion assembly behind the debris ejection zone,
 wherein the at least one enclosure is ring-shaped and positioned about the at least one exhaust duct of the propulsion system, or about the exhaust gas stream coming out of the at least one exhaust duct, or about both, wherein the at least one enclosure comprises a front transverse wall pressed against the rear transverse face of the nacelle and substantially concentric inner and outer walls respectively extending the inner wall and the aerodynamic outer wall of the nacelle, wherein the at least one conditioning system comprises at least one heat exchanger close to or in contact with the hot exhaust gas stream coming out of the propulsion system, and wherein the supply device further comprises a jet nozzle configured to extend the exhaust duct and to accommodate or bear at least one heat exchanger, said jet nozzle being spaced apart from the at least one enclosure and connected to the at least one enclosure by at least one aerodynamic fork and configured to accommodate a circuit portion channelling a fluid traversing the at least one heat exchanger.

2. The propulsion assembly according to claim 1, wherein the at least one conditioning system comprises a first heat exchanger close to or in contact with the exhaust gas stream coming out of the exhaust duct, in which a heat-transfer fluid other than the gaseous fuel circulates, at least a first circuit channelling the heat-transfer fluid, at least a second circuit channelling the gaseous fuel, and a second heat exchanger remote from the exhaust gas stream, traversed by the first and second circuits and configured to exchange heat between the heat-transfer fluid and the gaseous fuel.

3. The propulsion assembly according to claim 1, wherein the propulsion assembly further comprises a connection system connecting the exhaust duct and the jet nozzle.

4. The propulsion assembly according to claim 1, wherein the jet nozzle comprises a front end oriented towards the exhaust duct and positioned about the exhaust duct, and wherein the propulsion assembly comprises at least one ring gasket interposed between the front end of the jet nozzle and the exhaust duct.

5. The propulsion assembly according to claim 1, wherein the at least one enclosure is fluid-tight and contains a protective atmosphere.

6. The propulsion assembly according to claim 5, wherein the supply device comprises a vacuum system that is static in relation to the propulsion assembly and that is configured to extract a gas from the at least one enclosure and to maintain a near-zero pressure in the at least one enclosure.

7. The propulsion assembly according to claim 1, wherein the supply device comprises at least one shield configured to protect the downstream duct and to withstand any debris projected by the propulsion system.

8. An aircraft comprising:
the propulsion assembly according to claim 1.

9. The aircraft according to claim 8 further comprising:
for each propulsion assembly, a pylon connecting said propulsion assembly to a part of the aircraft, and
a connection system connecting the at least one enclosure and the pylon.

10. A propulsion assembly, comprising:
a propulsion system including at least one exhaust duct, from which an exhaust gas stream is discharged, and a debris ejection zone,
a nacelle surrounding the propulsion system and comprising an inner wall spaced apart from the propulsion system, an aerodynamic outer wall, and a rear transverse face connecting the inner wall and the aerodynamic outer wall,
a supply device configured to supply the propulsion system with gaseous fuel and comprising at least one conditioning system for the gaseous fuel and at least one downstream duct connecting the at least one conditioning system and the propulsion system, wherein the supply device further comprises at least one enclosure in which the conditioning system is positioned, the at least one enclosure located in the propulsion assembly behind the debris ejection zone, wherein the at least one enclosure is ring-shaped and positioned about the at least one exhaust duct of the propulsion system, or about the exhaust gas stream coming out of the at least one exhaust duct, or about both, wherein the at least one enclosure comprises a front transverse wall pressed against the rear transverse face of the nacelle and substantially concentric inner and outer walls respectively extending the inner wall and the aerodynamic outer wall of the nacelle, wherein the at least one enclosure is fluid-tight and contains a protective atmosphere, and, wherein the supply device comprises a vacuum system that is static in relation to the propulsion assembly and that is configured to extract a gas from the at least one enclosure and to maintain a near-zero pressure in the at least one enclosure.

11. An aircraft comprising:
a propulsion assembly comprising
a propulsion system including at least one exhaust duct, from which an exhaust gas stream is discharged, and a debris ejection zone,
a nacelle surrounding the propulsion system and comprising an inner wall spaced apart from the propulsion system, an aerodynamic outer wall, and a rear transverse face connecting the inner wall and the aerodynamic outer wall,
a supply device configured to supply the propulsion system with gaseous fuel and comprising at least one conditioning system for the gaseous fuel and at least one downstream duct connecting the at least one conditioning system and the propulsion system, wherein the supply device further comprises at least one enclosure in which the conditioning system is positioned, the at least one enclosure located in the propulsion assembly behind the debris ejection zone, wherein the at least one enclosure is ring-shaped and positioned about the at least one exhaust duct of the propulsion system, or about the exhaust gas stream coming out of the at least one exhaust duct, or about both, wherein the at least one enclosure comprises a front transverse wall pressed against the rear transverse face of the nacelle and substantially concentric inner and outer walls respectively extending the inner wall and the aerodynamic outer wall of the nacelle, wherein the at least one enclosure is fluid-tight and contains a protective atmosphere, and, wherein the supply device comprises a vacuum system that is static in relation to the propulsion assembly and that is configured to extract a gas from the at least one enclosure and to maintain a near-zero pressure in the at least one enclosure.

* * * * *